US009074533B2

(12) United States Patent
Hiller

(10) Patent No.: US 9,074,533 B2
(45) Date of Patent: Jul. 7, 2015

(54) SYSTEM FOR INJECTING A FLUID, COMPRESSOR AND TURBOMACHINE

(75) Inventor: Sven Hiller, Roehrmoos (DE)

(73) Assignee: MTU Aero Engines GmbH, Munich (DE)

( * ) Notice: Subject to any disclaimer, the term of this patent is extended or adjusted under 35 U.S.C. 154(b) by 91 days.

(21) Appl. No.: 13/549,074

(22) Filed: Jul. 13, 2012

(65) Prior Publication Data

US 2013/0180249 A1 Jul. 18, 2013

(30) Foreign Application Priority Data

Jul. 15, 2011 (DE) ........................ 10 2011 107 523

(51) Int. Cl.

| | |
|---|---|
| ***F01B 25/00*** | (2006.01) |
| ***F02C 7/22*** | (2006.01) |
| ***F04D 27/02*** | (2006.01) |
| ***F04D 29/66*** | (2006.01) |
| ***F04D 29/68*** | (2006.01) |

(52) U.S. Cl.

CPC .............. *F02C 7/22* (2013.01); *F04D 27/0238* (2013.01); *F04D 29/667* (2013.01); *F04D 29/684* (2013.01)

(58) Field of Classification Search

CPC . F04D 15/0011; F04D 27/0207; F04D 9/005; F04D 27/0215; F04D 29/681; F01D 5/145; Y02T 50/166

USPC ......... 60/39.091, 785; 415/11, 26, 58.4, 58.5, 415/116, 117, 914

See application file for complete search history.

(56) References Cited

U.S. PATENT DOCUMENTS

| | | | | |
|---|---|---|---|---|
| 4,086,022 | A * | 4/1978 | Freeman et al. | 415/119 |
| 5,308,225 | A * | 5/1994 | Koff et al. | 415/57.3 |
| 5,762,470 | A * | 6/1998 | Gelmedov et al. | 415/57.4 |
| 6,574,965 | B1 * | 6/2003 | Feulner | 60/785 |
| 8,220,276 | B2 * | 7/2012 | Clemen et al. | 60/785 |
| 8,262,340 | B2 * | 9/2012 | Guemmer | 415/57.1 |
| 8,419,355 | B2 * | 4/2013 | Guemmer et al. | 415/173.1 |
| 2003/0035715 | A1 * | 2/2003 | Torrance | 415/58.5 |
| 2006/0104805 | A1 * | 5/2006 | Gummer | 415/58.5 |
| 2009/0252596 | A1 * | 10/2009 | Guemmer | 415/115 |
| 2009/0317232 | A1 * | 12/2009 | Guemmer | 415/58.5 |
| 2010/0034637 | A1 * | 2/2010 | Guemmer | 415/58.5 |
| 2011/0103931 | A1 * | 5/2011 | Hiller | 415/1 |
| 2011/0200470 | A1 | 8/2011 | Schütz et al. | |

FOREIGN PATENT DOCUMENTS

DE 10 2008 052 372 A1 4/2010

* cited by examiner

*Primary Examiner* — Gerald L Sung

(74) *Attorney, Agent, or Firm* — Crowell & Moring LLP

(57) ABSTRACT

A system for injecting a fluid into a wall boundary layer of a flow in a turbomachine is disclosed. The system has a plurality of nozzles which are disposed in a side wall limiting the flow and are oriented diagonally in the direction of flow. The nozzles each have a rectangular, flat nozzle cross-section. A compressor having such a system, as well as a turbomachine having such a compressor, are also disclosed.

12 Claims, 2 Drawing Sheets

SYSTEM FOR INJECTING A FLUID, COMPRESSOR AND TURBOMACHINE

This application claims the priority of German Patent Document No. DE 10 2011 107 523.6, filed Jul. 15, 2011, the disclosure of which is expressly incorporated by reference herein.

BACKGROUND AND SUMMARY OF THE INVENTION

The invention relates to a system for injecting a fluid into a wall boundary layer of a flow in a turbomachine, a compressor and a turbomachine.

In the case of compressors in turbomachines, when operating the compressor outside a design point of the rotor blades, a so-called compressor surging may occur on a regular basis, in which the pressure in the compressor drops from the rear to the front due to a flow separation on the rotor blades and a backflow is formed. Such compressor surging has a disadvantageous effect on the efficiency of the turbomachine. In addition, high stresses occur in the blading, which are attributable to some extent to oscillating or shimming during the backflow phase. The risk of a flow separation may be reduced if a wall boundary layer of the annular space flow is energized. Energizing the wall boundary layer may be accomplished by passive systems such as stator-side ribs or depressions. On the other hand, active systems are known that provide an injection of a fluid through a plurality of nozzles disposed on the circumferential side into the annular space flow. Known active systems have nozzles with a round cross-section, whereby, however, only very limited energizing of the wall boundary layer takes place and high mixing losses also occur. An active system with rectangular nozzle cross-sections and a length/height ratio of approx. l/h=3 is known from German Patent Document No. DE 10 2008 052 372 A1. However, these types of high nozzle cross-sections produce a comparatively high retroactive effect of the annular space flow on the nozzle flow.

The object of the invention is creating a system for injecting a fluid into a wall boundary layer of a flow in a turbomachine, which eliminates the aforementioned disadvantages and makes better energizing possible as well as a reduction of mixing losses. In addition, the object of the invention is creating a compressor with a higher surge limit as well as a turbomachine with an improved efficiency.

A system according to the invention for injecting a fluid into a wall boundary layer of a flow in a turbomachine has a plurality of nozzles, which are disposed in a side wall limiting the flow and are oriented diagonally in the direction of flow. According to the invention, the nozzles each have a rectangular, flat nozzle cross-section. In particular, the nozzles have a nozzle cross-section with a length/height ratio (l/h) of approx. l/h=4 to 20. Because of the rectangular, flat and, in particular, slot-like nozzle cross-section, the so-called Coanda effect is improved and used more efficiently, whereby an improved energizing of the wall boundary layer is effected with minimal mixing losses.

Efficiency is able to be further increased if an injection channel having a constriction forming a boundary surface is disposed upstream from each of the nozzles. The constriction makes it possible for a low annular space pressure to prevail in the nozzle and therefore a pressure surge is applied away from the side wall in the nozzle. As a result, the to-be-injected fluid impacts the boundary surface perpendicularly, whereby it is coupled into the nozzle without breaking.

In order to reduce flow turbulence downstream from the constriction within the nozzles, it is advantageous if the boundary surface defines the nozzle cross-section and the fluid in the nozzles or the nozzle flow is not subject to any additional changes in pressure or speed.

The constriction may be designed so that it is beneficial for flow if the injection channel is tapered in the direction of the constriction in a wedge-shaped or funnel-shaped manner.

It may be advantageous for a further increase in efficiency if the nozzles are arranged to be flat in the direction of flow, because the fluid is hereby injected almost in the axial direction of the flow.

For example, the nozzles are arranged at an angle of ≤40° with respect to the direction of flow. They are preferably arranged at an angle of 30° with respect to the direction of flow.

In the case of an exemplary embodiment, the nozzle outlet areas are oriented tangentially to the direction of rotation, whereby the nozzle flow is injected non-rotationally into the flow.

For a rotational impact of the injected fluid, the nozzle outlet areas can be arranged with respect to the direction of rotation. In this case, they may be arranged both in the direction of rotation as well as against the direction of rotation. For example, they are oriented at an angle of 20° in or against the direction of rotation.

A compressor according to the invention has a system according to the invention for injecting a fluid into a wall boundary layer. Such a compressor is characterized by a clearly expanded surge limit and therefore by a high level of compressor stability and reduced blade stress. In addition, there is no or almost no retroactive effect of the annular space flow of the compressor on the nozzle flow of the system so that the system is able to be operated stably in every operating state of the compressor.

The compressor stability may be increased effectively already with a minimal fluid quantity if the system is positioned with its nozzles opposite from the blade regions in which a flow separation is to be expected. In the case of an exemplary embodiment, the nozzles are thus disposed on the stator side in the area of trailing edges of at least one rotor blade row formed of rotor blades.

A turbomachine according to the invention has a compressor according to the invention. Such a turbomachine is characterized by low efficiency losses and therefore by a high degree of efficiency, because energizing the wall boundary layer is improved and mixing losses are reduced.

Preferred exemplary embodiments of the invention will be explained in greater detail in the following on the basis of the very simplified schematic representations.

DETAILED DESCRIPTION OF THE DRAWINGS

Figure 1:
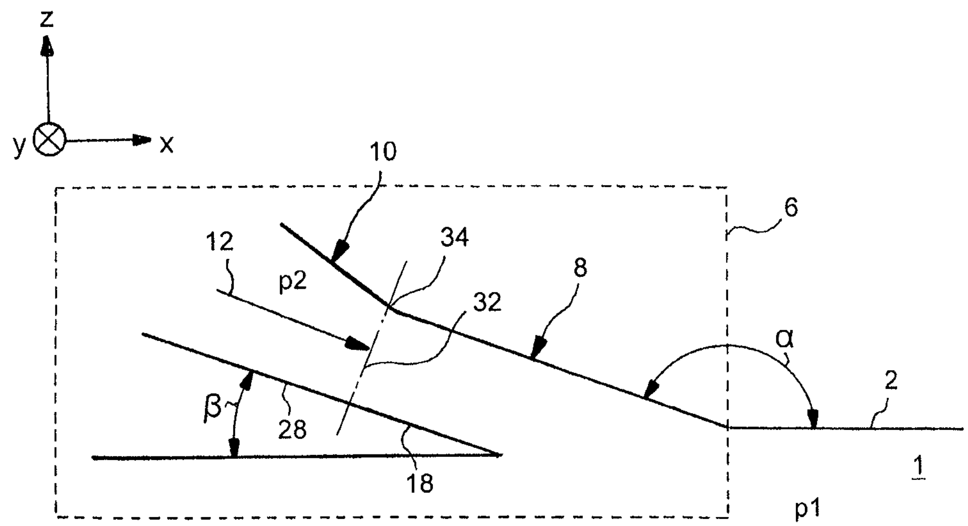
FIG. 1 is a partial section through an annular space of a compressor of a turbomachine.

FIG. 1 shows a partial view through an annular space 1 of a compressor of an aircraft engine. The annular space 1, in which the low annular space pressure p1 prevails, is radially limited by a side wall 2, and a flow 4 oriented in the longitudinal direction x of the aircraft engine flows through it.

A system 6 framed by a dotted line that has a plurality of nozzles 8 and a plurality of injection channels 10 is disposed on the circumferential side in an axial section of the side wall 2. The system 6 is used to energize a wall boundary layer of the flow 4 and makes it possible to inject a fluid 12 in the annular space 1 at a high injection pressure p2.

Figure 2:
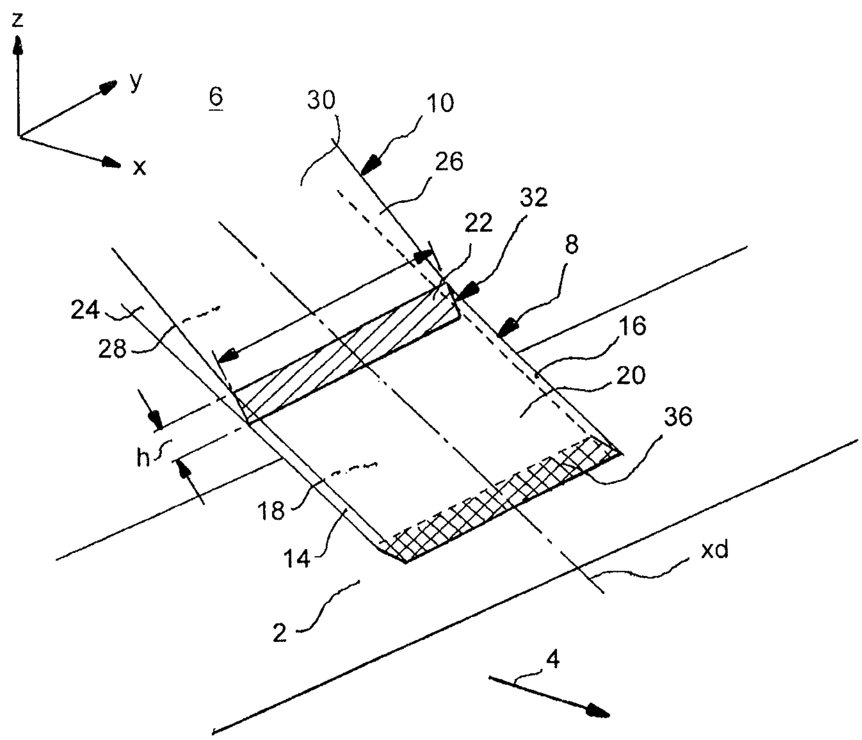
FIG. 2 is a perspective representation of a system according to the invention.

The nozzles 8 are distributed uniformly spaced apart from one another over the circumference of the annular space 1. They are each disposed downstream from an injection channel 10 and discharge into the annular space 1. As FIG. 2 shows, they have a nozzle longitudinal axis xd, which is arranged diagonally with respect to the longitudinal axis x of the aircraft engine and therefore to the flow 4.

The nozzles 8 each have two lateral walls 14, 16 along with a radially inward or inner wall 18 and a radially outward or outer wall 20. The walls 14, 16, 18, 20 define a rectangular, flat and constant nozzle cross-section 22, which is depicted in a longitudinally hatched pattern. The nozzle cross-section 22 is constant over the nozzle length xd and has a slot-like shape with a length/height ratio (l/h) of approx. l/h=4 to 20.

The injection channels 10 are disposed between the nozzles 8 and a blower (not shown). As FIG. 2 shows, they each have two lateral walls 24, 26 as well as a radial inner wall 28 and a radial outer wall 30. The walls 24, 26, 28, 30 define a rectangular cross-section tapering in a wedge-shape in the direction of flow. In doing so, the lateral walls 24, 26 as well as the inner wall 28 are oriented parallel to the nozzle longitudinal axis xd and merge flush in the lateral nozzle walls 14, 16 or the inner nozzle wall 18. The outer wall 30 of the injection channel 10 is oriented diagonally in the direction of the nozzle longitudinal axis xd, whereby a constriction 32 labeled in FIG. 1 and formed as a cross-sectional taper is created, which defines a boundary surface 34 arranged orthogonally to the nozzle longitudinal axis xd.

The boundary surface 34 separates the high injection pressure p2 from the low annular space pressure p1 with respect to the pressure conditions. The high injection pressure p2 predominates upstream from the boundary surface 34 in the injection channels 10. The low annular space pressure pl predominates downstream from the boundary surface 34 in the nozzles 8 and in the annular space 1. Thus, the boundary surface 34 forms a separation plane between two different dense media 4, 12 or fluids, wherein however the fluid 12 is coupled into the thinner medium 4 without breaking because of the alignment of the boundary surface 34 orthogonally to the nozzle longitudinal axis xd.

To make an injection of the fluid 12 possible almost in the axial direction of the flow 4, the nozzle longitudinal axis xd is arranged to be flat in relation to the longitudinal axis x of the aircraft engine. "Flat" in this case means at an exterior angle $\alpha$ between the side wall 2 and the outer nozzle wall 20 with $\alpha \geq 150°$. Alternatively, "flat" means at an interior angle $\beta$ between the side wall 2 and the inner nozzle wall 18 or the inner injection channel wall 28 with $\beta \leq 40°$, preferably $\beta = 30°$. It is also mentioned here that the annular space 1, as shown in FIG. 1, may be expanded radially downstream from the nozzles 8 so that a partial flow of the fluid 12 or of a nozzle flow is injected axially or virtually axially in the wall boundary layer.

The nozzles 8 each have a nozzle outlet area 36 that is depicted in a cross-hatched pattern in FIG. 2. As FIGS. 3, 4 and 5 show, the nozzle outlet area discharges respectively radially opposite from a trailing edge region 38 of a blade row formed by rotor blades 40 in the annular space 1.

Figure 3:
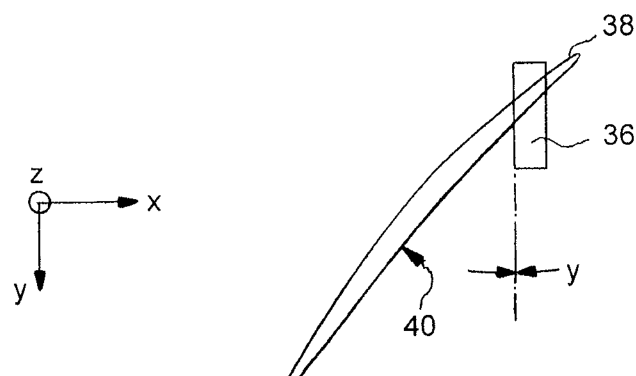
FIGS. 3, 4 and 5 are top views of an uncoiled circumferential section of a rotor blade row each having a stator-side system nozzle.

As also shown in FIG. 3, the nozzle outlet areas 36 run in the case of an exemplary embodiment tangentially in the circumferential direction y and therefore tangentially to the direction of rotation.

Figure 4:
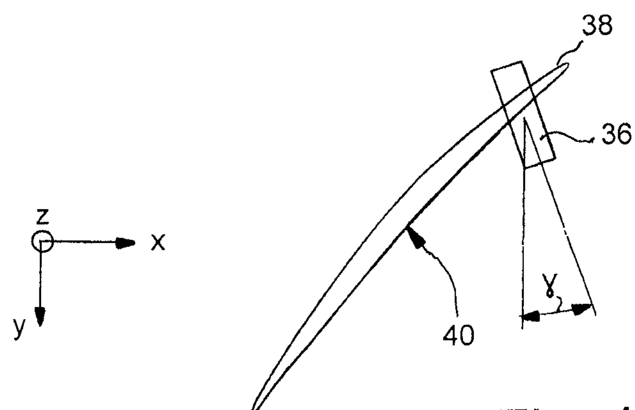

In the case of an exemplary embodiment shown in FIG. 4, the nozzle outlet areas 36 are arranged for rotational impact of the fluid 12 at an angle $\gamma$ in the direction of rotation.

Figure 5:
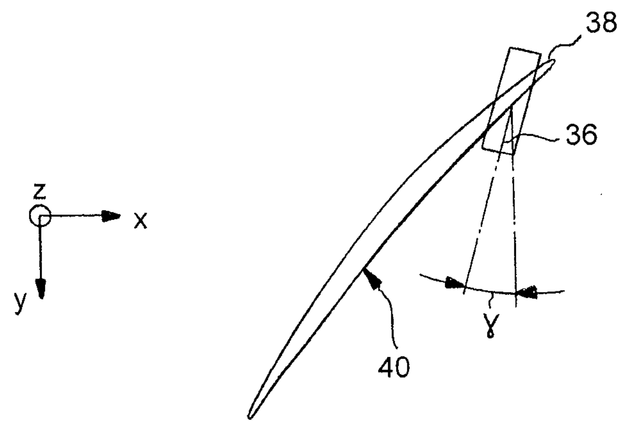

In the case of an exemplary embodiment shown in FIG. 5, the nozzle outlet areas 36 are arranged for rotational impact of the fluid 12 at an angle $\gamma$ against the direction of rotation. In the exemplary embodiments according to FIGS. 4 and 5, the angle $\gamma$ is preferably $\pm 20°$ from the direction of rotation or the circumferential direction y.

Disclosed are a system for injecting a fluid into a wall boundary layer of a flow in a turbomachine having a plurality of nozzles, which are disposed in a side wall limiting the flow and are oriented diagonally in the direction of flow, wherein the nozzles each have a rectangular, flat nozzle cross-section, a compressor having such a system, as well as a turbomachine having such a compressor.

LIST OF REFERENCE NUMBERS

1 Annular space
2 Side wall
4 Flow
6 System
8 Nozzles
10 Injection channel
12 Fluid
14 Lateral wall
16 Lateral wall
18 Inner wall
20 Outer wall
22 Nozzle cross-section
24 Lateral wall
26 Lateral wall
28 Inner wall
30 Outer wall
32 Constriction
34 Boundary surface
36 Nozzle outlet area
38 Trailing edge region
40 Rotor blade
l Length of nozzle cross-section
h Height of nozzle cross-section
p1 Annular space pressure
p2 Injection pressure
x Longitudinal axis of the aircraft engine
y Circumferential direction/direction of rotation
z Vertical direction/radial direction
xd Nozzle longitudinal axis
$\alpha$ Exterior angle
$\beta$ Interior angle
$\gamma$ Angle of nozzle outlet area with respect to direction of rotation The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for injecting a fluid in a wall boundary layer of a flow in a turbomachine, comprising:

a nozzle, wherein the nozzle is disposed in a side wall of the turbomachine, wherein the side wall limits the flow, wherein the nozzle is oriented diagonally with respect to a direction of flow in the turbomachine, wherein the nozzle has a rectangular nozzle cross-section, and wherein an inner wall of the nozzle extends linearly in a straight line from the side wall at an angle between the inner wall of the nozzle and the side wall of between 30° and 40°; and an injection channel disposed upstream from the nozzle in the direction of flow, wherein the injection channel has a constriction that forms a boundary surface.

2. The system according to claim 1, wherein the injection channel has an expanded funnel-shape upstream from the constriction in the direction of flow.

3. The system according to claim 1, wherein an outlet area of the nozzle is oriented tangentially to a direction of rotation of the turbomachine.

4. The system according to claim 1, wherein an outlet area of the nozzle is disposed ±20° from the direction of rotation of the turbomachine.

5. A compressor having a system according to claim 1.

6. The compressor according to claim 5, wherein the nozzle is disposed on a stator side in a trailing edge region of at least one blade row formed of rotor blades.

7. A turbomachine having a compressor according to claim 5.

8. The system according to claim 1, wherein the nozzle cross-section has a length/height ratio (l/h) of approximately l/h=4 to20.

9. The system according to claim 1, wherein the boundary surface is aligned orthogonally to a longitudinal axis of the nozzle and separates a high injection pressure upstream from the boundary surface in the injection channel from a low annular space pressure downstream from the boundary surface in the nozzle.

10. A compressor, comprising:

a side wall;

a nozzle, wherein the nozzle is disposed in the side wall, wherein the nozzle is oriented diagonally with respect to a direction of flow through the compressor, wherein the nozzle has a rectangular nozzle cross-section, and wherein an inner wall of the nozzle extends linearly in a straight line from the side wall at an angle between the inner wall of the nozzle and the side wall of between 30° and 40°; and an injection channel disposed upstream from the nozzle in the direction of flow, wherein the injection channel has a constriction that forms a boundary surface.

11. The compressor according to claim 10, wherein the nozzle cross-section has a length/height ratio (l/h) of approximately l/h=4 to 20.

12. The compressor according to claim 10, wherein the boundary surface is aligned orthogonally to a longitudinal axis of the nozzle and separates a high injection pressure upstream from the boundary surface in the injection channel from a low annular space pressure downstream from the boundary surface in the nozzle.

* * * * *